United States Patent
Hsu et al.

(10) Patent No.: US 12,554,046 B2
(45) Date of Patent: *Feb. 17, 2026

(54) DISPLAY DEVICE

(71) Applicant: Innolux Corporation, Miaoli County (TW)

(72) Inventors: Yu-Chun Hsu, Miaoli County (TW); Wei-Ming Chu, Miaoli County (TW); Sheng-Nan Fan, Miaoli County (TW); Shih-Fu Liao, Miaoli County (TW); I-An Yao, Miaoli County (TW); Chiu-Lien Yang, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 358 days.

This patent is subject to a terminal disclaimer.

(21) Appl. No.: 18/314,159

(22) Filed: May 9, 2023

(65) Prior Publication Data

US 2023/0408730 A1 Dec. 21, 2023

Related U.S. Application Data

(60) Provisional application No. 63/352,641, filed on Jun. 16, 2022.

(30) Foreign Application Priority Data

Mar. 17, 2023 (CN) .......................... 202310262110.4

(51) Int. Cl.
*G02B 1/11* (2015.01)
*G02B 1/14* (2015.01)
*G02B 5/30* (2006.01)

(52) U.S. Cl.
CPC ................. *G02B 1/11* (2013.01); *G02B 1/14* (2015.01); *G02B 5/3025* (2013.01)

(58) Field of Classification Search
CPC .......... G02B 1/11; G02B 1/14; G02B 5/3025
See application file for complete search history.

(56) References Cited

U.S. PATENT DOCUMENTS

| | | | |
|---|---|---|---|
| 12,211,455 B2* | 1/2025 | Hsu | ................... H04M 1/72454 |
| 2009/0315869 A1 | 12/2009 | Sugihara et al. | |
| 2020/0239360 A1 | 7/2020 | Minowa | |
| 2020/0301204 A1 | 9/2020 | Wang | |
| 2024/0027811 A1* | 1/2024 | Hsu | ....................... G02B 6/0036 |
| 2024/0062178 A1 | 2/2024 | McDonnell | |
| 2024/0272342 A1 | 8/2024 | Kim | |

FOREIGN PATENT DOCUMENTS

| | | |
|---|---|---|
| TW | 200745591 | 12/2007 |
| TW | 202222575 | 6/2022 |

OTHER PUBLICATIONS

Non-Final Office Action issued in U.S. Appl. No. 18/671,002, filed May 22, 2024, mailed May 16, 2025.

\* cited by examiner

*Primary Examiner* — Phu Vu
(74) *Attorney, Agent, or Firm* — JCIPRNET

(57) ABSTRACT

A display device includes a display panel and an optical structure layer. The optical structure layer is disposed on the display panel. A glossiness of the optical structure layer is between 4 GU and 35 GU, and a reflectivity of specular component included (SCI) of the optical structure layer is between 3% and 6%. The display device disclosed in the disclosure may reduce an influence of a displayed image from ambient light from the outside.

22 Claims, 6 Drawing Sheets

DISPLAY DEVICE

CROSS-REFERENCE TO RELATED APPLICATION

This application claims the priority benefits of U.S. provisional application Ser. No. 63/352,641, filed on Jun. 16, 2022, and China application serial no. 202310262110.4, filed on Mar. 17, 2023. The entirety of each of the above-mentioned patent applications is hereby incorporated by reference herein and made a part of this specification.

BACKGROUND

Technical Field

The disclosure relates to a display device.

Description of Related Art

When a display device is used outdoors, ambient light from the outside will be irradiated to the display device to generate reflected light, so that an image displayed on the display device is interfered by the reflected light, causing a decrease in contrast, resulting in a decrease in display quality.

SUMMARY

The disclosure provides a display device, which may reduce an influence of a displayed image from ambient light from the outside.

A display device according to some embodiments of the disclosure includes a display panel and an optical structure layer. The optical structure layer is disposed on the display panel. A glossiness of the optical structure layer is between 4 GU and 35 GU, and a reflectivity of specular component included (SCI) of the optical structure layer is between 3% and 6%.

In order for the aforementioned features and advantages of the disclosure to be more comprehensible, embodiments accompanied with drawings are described in detail below.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Figure 1A:
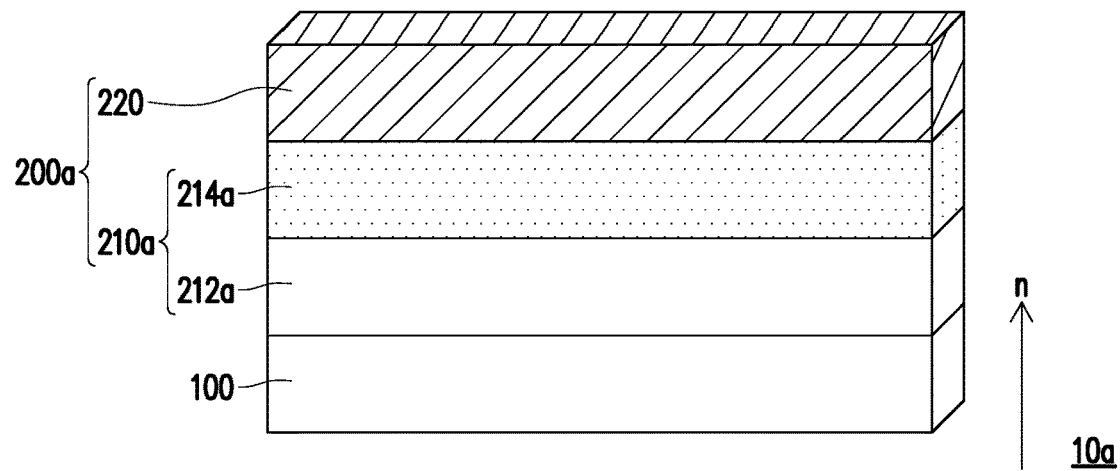
FIG. 1A is a schematic perspective view of a display device according to the first embodiment of the disclosure.

Reference will now be made in detail to the exemplary embodiments of the disclosure, and examples of the exemplary embodiments are illustrated in the accompanying drawings. Whenever possible, the same reference numerals are used in the drawings and descriptions to indicate the same or similar parts.

The disclosure can be understood by referring to the following detailed description in combination with the accompanying drawings. It should be noted that in order to make it easy for the reader to understand and for the simplicity of the drawings, the multiple drawings in this disclosure only depict a part of the electronic device, and the specific components in the drawings are not drawn according to actual scale. In addition, the number and size of each component in the drawings are only for exemplary purpose, and are not intended to limit the scope of the disclosure.

Throughout the disclosure and the appended claims, certain words are used to refer to specific components. Those skilled in the art should understand that electronic device manufacturers may refer to the same components by different names. The disclosure does not intend to distinguish those components with the same function but different names. In the following description and claims, the terms "including", "containing", and "having" are open-ended terms, so they should be interpreted as "include but not limited to . . . ". Therefore, when the terms "including", "containing", and/or "having" are used in the description of this disclosure, they specify the existence of a corresponding feature, region, step, operation, and/or component, but do not exclude the existence of one or more corresponding features, regions, steps, operations, and/or components.

Direction terms mentioned in this specification, such as such as "up," "down," "front," "back," "left," and "right," merely refer to directions in the accompanying drawings. Therefore, the direction terms used is for illustration, not for limiting this disclosure. In the drawings, each drawing shows the general features of the method, structure, and/or material used in a specific embodiment. However, these drawings should not be construed as defining or limiting the scope or nature of the embodiments. For example, for the sake of clarity, the relative size, thickness, and position of each layer, region, and/or structure may be reduced or enlarged.

When a corresponding member (such as a layer or a region) is described as being "on another member," it may be directly on another member, or there may be other member therebetween. On the other hand, when a member is described as being "directly on another member," no member exists therebetween. In addition, when a member is described as being "on another member," the two have a vertical relationship in the top view direction, and this member may be located above or below the other member, and the vertical relationship depends on the device orientation.

The terms "equal to" or "same", and "essentially" or "substantially" are generally interpreted as within 20% of a given value or range, or as within 10%, 5%, 3%, 2%, 1%, or 0.5% of the value or range.

Ordinal numbers in this specification and the claims such as "first" and "second" are used to modify a component, and do not imply or represent that the (or these) component(s) has (or have) any ordinal number, and do not indicate any order between a component and another component, or an order in a manufacturing method. These ordinal numbers are merely used to clearly distinguish a component having a name with another component having the same name. Different terms may be used in the claims and the specification, so that a first member in the specification may be a second member in the claims.

It should be understood that the following embodiments may disassemble, replace, reorganize, and mix the features in several different embodiments to complete other embodiments without departing from the spirit of the disclosure. As long as the features of the embodiments do not violate the spirit of the disclosure or conflict each other, they may be mixed and matched as desired.

Electrical connection or coupling described in the disclosure may refer to direct connection or indirect connection. In the case of direct connection, terminals of elements on two circuits are directly connected or connected to each other by a conductor segment. In the case of indirect connection, there is a switch, a diode, a capacitor, an inductor, a resistor, other suitable elements, or a combination of the above elements between the terminals of the elements on the two circuits, but not limited thereto.

In the disclosure, the thickness, length, width, and area may be measured by an optical microscope, and the thickness may be measured from a cross-sectional image in an electron microscope, but it is not limited thereto. In addition, a certain error may be provided between any two values or directions used for comparison. If the first value is equal to the second value, it implies that an error of approximately 10% is provided between the first value and the second value. If the first direction is perpendicular to the second direction, the angle between the first direction and the second direction may be between 80 degrees and 100 degrees. If the first direction is parallel to the second direction, the angle between the first direction and the second direction may be between 0 degrees and 10 degrees.

A display device in the disclosure may be a non-self-luminous display device or a self-luminous display device. The display device may include, for example, diodes, liquid crystals, light emitting diodes (LEDs), quantum dots (QDs), fluorescence, phosphor, other suitable display media, or a combination of the above. The light emitting diodes may, for example, include organic light emitting diodes (OLEDs), mini light emitting diodes (mini LEDs), micro light emitting diodes (micro LEDs), or quantum dot light emitting diodes (QDLEDs), but the disclosure is not limited thereto. It should be noted that the display device may be arranged in any combination of the above, but the disclosure is not limited thereto. In addition, a shape of the display device may be rectangular, circular, polygonal, shaped with curved edges, or other suitable shapes. The display device may have peripheral systems such as a driving system, a control system, and a light source system.

Figure 1B:
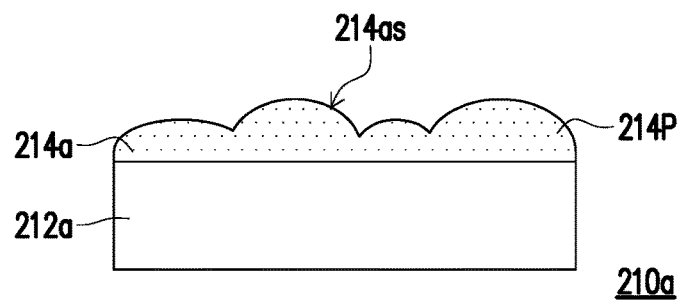
FIG. 1B is a schematic partial cross-sectional view of an anti-glare layer in an optical structure layer according to an embodiment of FIG. 1A.
Figure 1C:
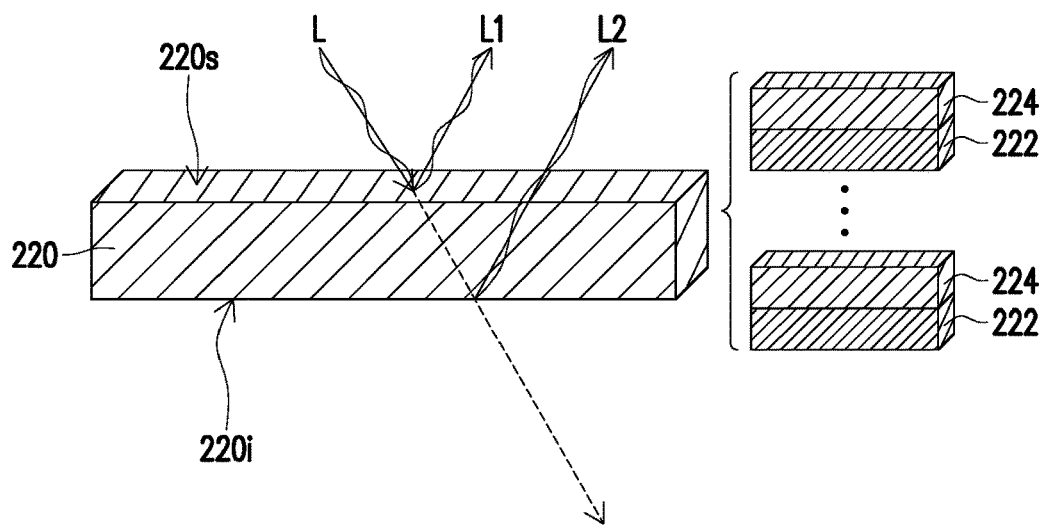
FIG. 1C is a schematic partial cross-sectional view of an antireflection layer in the optical structure layer according to the embodiment of FIG. 1A.

FIG. 1A is a schematic perspective view of a display device according to the first embodiment of the disclosure. FIG. 1B is a schematic partial cross-sectional view of an anti-glare layer in an optical structure layer according to an embodiment of FIG. 1A. FIG. 1C is a schematic partial cross-sectional view of an antireflection layer in the optical structure layer according to the embodiment of FIG. 1A.

Referring to both FIG. 1A and FIG. 1B, a display device 10a in this embodiment includes a display panel 100 and an optical structure layer 200a, but the disclosure is not limited thereto. The display device 10a in this embodiment may be applied to, for example, digital galleries, mobile phones, tablet computers, public information displays, and/or other electronic devices that may be used outdoors or in environments with high-intensity ambient light.

In some embodiments, the display device 10a may further include an anti-pollution layer (not shown), for example, to reduce an influence of pollution from an external environment, and for example, to prevent pollutants from easily adhering to a surface of the display device 10a facing the external environment.

In some embodiments, the display device 10a may include a liquid crystal display device, an organic light emitting diode display device, a micro light emitting diode display device, a reflective display device, or other suitable display devices, and the disclosure is not limited thereto.

The display panel 100 may, for example, include a substrate (not shown), an element layer (not shown), and a display medium (not shown). The substrate of the display panel 100 may include, for example, a flexible substrate or an inflexible substrate. A material of the substrate may, for example, include glass, plastic, or a combination thereof. For example, the substrate of the display panel 100 may include quartz, sapphire, polymethyl methacrylate (PMMA), polycarbonate (PC), polyimide (PI), polyethylene terephthalate (PET), other suitable materials, or a combination of the above materials, but the disclosure is not limited thereto. The element layer of the display panel 100 is, for example, disposed on the substrate, and may, for example, include a circuit structure to drive the display medium. For example, the element layer of the display panel 100 may include multiple scan lines, multiple data lines, an insulating layer, a capacitor, multiple transistors, and/or multiple electrodes, etc., but the disclosure is not limited thereto. In some embodiments, the element layer of the display panel 100 may include multiple circuits instead of the transistors. The display medium of the display panel 100 may be disposed on the element layer, for example. In some embodiments, the display medium of the display panel 100 may include multiple light emitting elements, which may emit light of various suitable colors (such as red light, green light, blue light, white light, etc.) or UV light, but the disclosure is not limited thereto. For example, the display medium of the display panel 100 may include self-luminous materials, which may include diodes, organic light emitting diodes (OLED s), inorganic light emitting diodes (LEDs), such as mini light emitting diodes (mini LEDs) or micro light emitting diodes (micro LEDs), quantum dots (QDs), quantum dot light emitting diodes (QDLEDs), fluorescence, phosphor, other suitable materials, or a combination of the above materials, but the disclosure is not limited thereto. In other embodiments, the display medium of the display panel 100 may include non-self-luminous materials, which may include liquid crystal molecules, electrophoretic display media, or other suitable display media. The liquid crystal molecules are liquid crystals that may be rotated or switched by a vertical electric field or liquid crystal molecules that may be rotated or switched by a transverse electric field, but the disclosure is not limited thereto.

The optical structure layer 200a is disposed on the display panel 100, for example. The optical structure layer 200a includes, for example, an anti-glare layer 210a and an antireflection layer 220.

In some embodiments, the anti-glare layer 210a may include a cover plate 212a and an anti-glare film 214a, but the disclosure is not limited thereto.

The cover plate 212a is, for example, disposed on the display panel 100 and located between the display panel 100 and the anti-glare film 214a in a normal direction n of the display panel 100. The cover plate 212a may, for example, have effects such as dustproof, scratch-resistant, and waterproof intrusion to reduce an influence of the external environment on internal components of the display panel 100, and may, for example, have a light transmittance. In some embodiments, a material of the cover plate 212a may include glass. A type of glass or a composition thereof is not particularly limited, which may be, for example, aluminosilicate glass, lithium aluminosilicate glass, soda calcium silicate glass, aluminosilicate glass, quartz glass, or other glass having the light transmittance, but the disclosure is not limited thereto. In other embodiments, the material of the cover plate 212a may include organic materials, such as resin, acrylic, or other suitable organic materials.

The anti-glare film 214a is, for example, disposed on the cover plate 212a, and has a rough surface 214as, for example. On this basis, the surface of the anti-glare film 214a may be used, for example, to increase diffusion of the ambient light from the outside and/or reduce direct reflection of the ambient light from the outside, so that the anti-glare film 214a has anti-glare properties to improve comfort of a user viewing the display device 10a. In some embodiments, the anti-glare film 214a may be formed by performing a coating process to coat a curable composition on the cover plate 212a (a support body), and then perform a curing process on the curable composition. The above coating process may include a spray coating process, and the above curing process may include a light curing process or a thermal curing process. However, the disclosure is not limited thereto. In other embodiments, the anti-glare film 214a may be formed by forming an anti-glare material layer (not shown) on the cover plate 212a and then performing a transfer process using a mold (not shown) having a surface with a concave-convex structure.

In this embodiment, the anti-glare film 214a includes curable resin (such as photocurable resin or thermal curable resin) and multiple silicon dioxide particles MP. The silicon dioxide particles MP included in the anti-glare film 214a may, for example, form multiple irregular protrusions 214P on the surface 214as of the anti-glare film 214a away from the cover plate 212a, so that the anti-glare film 214a has the anti-glare properties. In some embodiments, an arithmetic average deviation (Ra) of a profile of the surface 214as of the anti-glare film 214a is between 0.1 μm and 0.5 μm (0.1 μm≤Ra≤0.5 μm), and an average width (Rsm) of the profile of the surface 214as of the anti-glare film 214a is between 5 μm and 20 μm (5 μm≤Rsm≤20 μm). The arithmetic average deviation (Ra) and the average width (Rsm) of the profile of the surface 214as of the anti-glare film 214a may be obtained, for example, by using KLA Tencor P-6 measurement, but the disclosure is not limited thereto.

The antireflection layer 220 is, for example, disposed on the anti-glare layer 210a. The antireflection layer 220 may be used, for example, to reduce a reflectivity of the ambient light from the outside to improve image quality displayed by the display device 10a. A method in which the antireflection layer 220 reduces the reflectivity of the ambient light from the outside may, for example, refer to FIG. 1C. For example, when ambient light L from the outside is irradiated to the antireflection layer 220, first reflected light L1 reflected by a surface 220s of the antireflection layer 220 away from the display panel 100 and second reflected light L2 reflected by an interface 220i (e.g., an interface between adjacent film layers in the antireflection layer 220 or an interface between the antireflection layer 220 and the anti-glare film 214a) between the antireflection layer 220 and the remaining film layers are generated. The first reflected light L1 and the second reflected light L2 have substantially opposite phases, so that destructive interference will occur between the first reflected light L1 and the second reflected light L2 to reduce an amplitude of the total reflected light reflected by the antireflection layer 220, so as to achieve an effect of reducing the reflectivity. The antireflection layer 220 may be, for example, a laminate. The laminate may, for example, include alternately stacked high reflectivity sub-layers 222 and low reflectivity sub-layers 224, and the total number of high reflectivity sub-layers 222 and low reflectivity sub-layers 224 is greater than or equal to 4. For example, the antireflection layer 220 may include four film layers in which the high reflectivity sub-layers 222 and the low reflectivity sub-layers 224 overlap each other. In addition, the antireflection layer 220 may include, for example, ten film layers in which the high reflectivity sub-layers 222 and the low reflectivity sub-layers 224 overlap each other. However, the disclosure is not limited thereto. A method for forming the high reflectivity sub-layer 222 and the low reflectivity sub-layer 224 included in the antireflection layer 220 may be, for example, formed by physical vapor deposition, which may be formed by, for example, evaporation, ion plating, or sputtering, or other suitable methods, but the disclosure is not limited thereto. In some embodiments, a material of the high reflectivity sub-layer 222 may include indium tin oxide (ITO), but the disclosure is not limited thereto. In some other embodiments, the material of the high reflectivity sub-layer 222 may include niobium oxide ($Nb_2O_5$), other suitable oxides, or a combination thereof, and the remaining oxides may be, for example, titanium oxide ($TiO_2$), zirconium oxide ($ZrO_2$), tantalum oxide ($Ta_2O_5$), but the disclosure is not limited thereto. In some embodiments, a thickness of the single high reflectivity sub-layer 222 is between 1 nm to 500 nm or between 1 nm to 300 nm. In some embodiments, a material of the low reflectivity sub-layer 224 may include silicon oxide ($SiO_2$), but the disclosure is not limited thereto. In other embodiments, the material of the low reflectivity sub-layer 224 may include fumed silica. In some embodiments, a thickness of the single low reflectivity sub-layer 224 is between 1 nm to 500 nm or between 1 nm to 300 nm. In addition, in some embodiments, the high reflectivity sub-layer 222 has an extinction coefficient (k) ranging from 0.01 to 0.05 (0.01≤k≤0.05), so that the antireflection layer 220 may generate a smoke-like effect.

The number of layers, materials, and thicknesses of the high reflectivity sub-layer 222 and the low reflectivity sub-layer 224 in the antireflection layer 220 are, for example, shown in Table 1 and Table 2 below, but the disclosure is not limited thereto. In Table 1, a stacking order of the high reflectivity sub-layer 222 and the low reflectivity sub-layer 224 from top to bottom is a first low reflectivity sub-layer, a first high reflectivity sub-layer, a second low reflectivity sub-layer, and a second high reflectivity sub-layer. In Table 2, the stacking order of the high reflectivity sub-layer 222 and the low reflectivity sub-layer 224 from top to bottom is the first low reflectivity sub-layer, the first high reflectivity sub-layer, the second low reflectivity sub-layer, the second high reflectivity sub-layer, a third low reflectivity sub-layer, a third high reflectivity sub-layer; a fourth low reflectivity sub-layer, a fourth high reflectivity sub-layer, a fifth low reflectivity sub-layer, and a fifth high reflectivity sub-layer.

TABLE 1

The material of the high reflectivity sub-layer 222 includes niobium oxide ($Nb_2O_5$), and the material of the low reflectivity sub-layer 224 includes silicon oxide ($SiO_2$).

| | Thickness (nm) |
|---|---|
| First low reflectivity sub-layer | 86.7 |
| First high reflectivity sub-layer | 110.5 |
| Second low reflectivity sub-layer | 36.0 |
| Second high reflectivity sub-layer | 11.7 |

TABLE 2

The material of the high reflectivity sub-layer 222 includes indium tin oxide (ITO), and the material of the low reflectivity sub-layer 224 includes silicon oxide ($SiO_2$).

| | Thickness (nm) |
|---|---|
| First low reflectivity sub-layer | 84.2 |
| First high reflectivity sub-layer | 72.09 |
| Second low reflectivity sub-layer | 14.14 |
| Second high reflectivity sub-layer | 25.73 |
| Third low reflectivity sub-layer | 134.55 |
| Third high reflectivity sub-layer | 15.07 |
| Fourth low reflectivity sub-layer | 27.56 |
| Fourth high reflectivity sub-layer | 259.91 |
| Fifth low reflectivity sub-layer | 24.96 |
| Fifth high reflectivity sub-layer | 21.47 |

In this embodiment, a glossiness of the optical structure layer 200a is between 4 GU and 35 GU (4 GU≤the glossiness of the optical structure layer 200a≤35 GU). For example, the glossiness of the optical structure layer 200a may be between 4 GU and 30 GU (4 GU≤the glossiness of the optical structure layer 200a≤30 GU), or may be between 4 GU and 20 GU (4 GU≤the glossiness of the optical structure layer 200a≤20 GU), but the disclosure is not limited thereto. The glossiness of the optical structure layer 200a may be obtained by measuring at an angle of 60° with a gloss meter BYK-4446 and using a glossiness standard of JIS Z8741, for example, but the disclosure is not limited thereto. In other embodiments, the glossiness of the optical structure layer 200a may be measured at an angle of 20° or an angle of 85°.

In this embodiment, a reflectivity of specular component included (SCI) of the optical structure layer 200a may be between 3% and 6% (3%≤the reflectivity of specular component included (SCI) of the optical structure layer 200a≤6%). For example, the reflectivity of specular component included (SCI) of the optical structure layer 200a may be between 4% and 6% (4%≤the reflectivity of specular component included (SCI) of the optical structure layer 200a≤6%), but the disclosure is not limited thereto. The reflectivity of specular component included (SCI) of the optical structure layer 200a may be obtained by measuring, for example, using a spectrophotometer Konica-Minolta CM-3600-d under a visible light band, but the disclosure is not limited thereto. For example, the reflectivity of specular component included (SCI) of the optical structure layer 200a may be measured under light with a wavelength of 550 nm.

In this embodiment, a transmittance of the optical structure layer 200a is between 70% and 98% (70%≤the transmittance of the optical structure layer 200a≤98%). For example, the transmittance of the optical structure layer 200a may be between 70% and 95% (70%≤the transmittance of the optical structure layer 200a≤95%), but the disclosure is not limited thereto. On this basis, the optical structure layer 200a in this embodiment may provide relatively good light transmission. The transmittance of the optical structure layer 200a may be obtained by measuring, for example, using a haze meter BYK-4725 under the visible light band, but the disclosure is not limited thereto. For example, the reflectivity of specular component included (SCI) of the optical structure layer 200a may be measured under the light with the wavelength of 550 nm.

In this embodiment, by enabling the optical structure layer 200a disposed on the display panel 100 to have the above structure, a glossiness of the display device 10a may be less than 5 GU, and a reflectivity of specular component included (SCI) of the display device 10a may be less than 3%. In addition, in this embodiment, a ratio of a reflectivity of specular component excluded (SCE) to the reflectivity of specular component included (SCI) of the display device 10a may be greater than 0.6 and less than 1 (0.6<SCE of the display device 10a/SCI of the display device 10a<1). The reflectivity of specular component excluded (SCE) of the display device 10a may be obtained by measuring, for example, using a spectrophotometer Konica-Minolta CM-3600-d under the visible light band, but the disclosure is not limited thereto. For example, the reflectivity of specular component excluded (SCE) of the display device 10a may be measured under the light with the wavelength of 550 nm. It is worth noting that a measurement method of the glossiness and specular component included (SCI) of the display device 10a may be, for example, the same or similar to a measurement method of the glossiness and specular component included (SCI) of the optical structure layer 200a. Therefore, the same details will not be repeated in the following.

On this basis, the display device 10a in this embodiment may have relatively good anti-glare performance, which may effectively scatter the ambient light from the outside, and reduce the influence of the reflection of the ambient light from the outside when the user views the display device 10a, thereby improving display quality of the display device 10a. Based on the above, when the user watches the electronic device (such as digital galleries, mobile phones, tablet computers, public information displays, and/or other electronic devices) including the display device 10a in this embodiment, the user may experience the feeling that the image displayed by the electronic device is like paper.

Figure 2A:
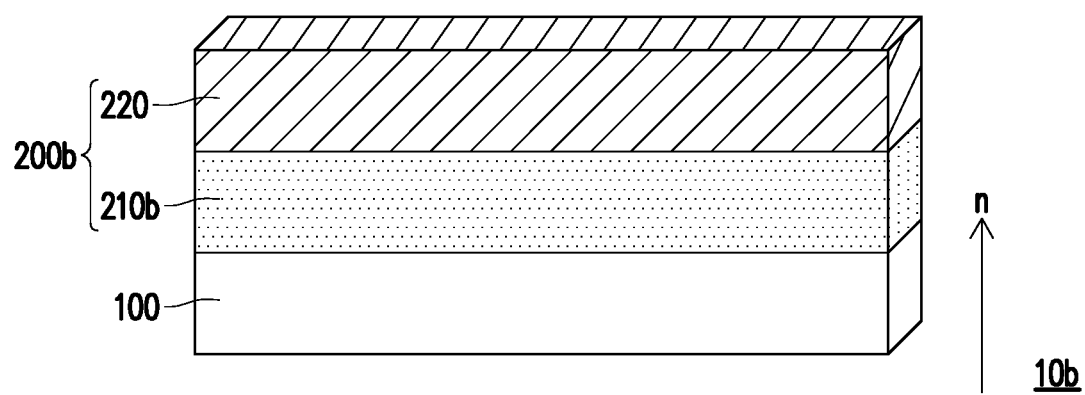
FIG. 2A is a schematic perspective view of a display device according to the second embodiment of the disclosure.
Figure 2B:
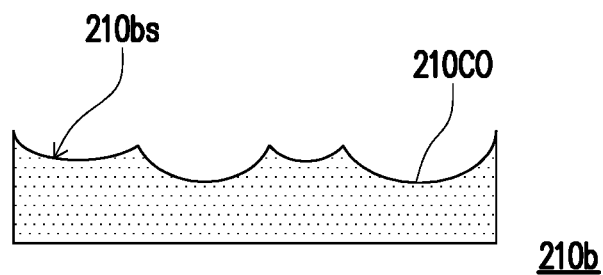
FIG. 2B is a schematic partial cross-sectional view of an anti-glare layer in an optical structure layer according to an embodiment of FIG. 2A.

FIG. 2A is a schematic perspective view of a display device according to the second embodiment of the disclosure. FIG. 2B is a schematic partial cross-sectional view of an anti-glare layer in an optical structure layer according to an embodiment of FIG. 2A. It should be noted that some of the reference numerals and descriptions of the embodiments of FIG. 1A and FIG. 1B will apply to the embodiments of FIG. 2A and FIG. 2B. The same or similar reference numerals will represent the same or similar components, and the descriptions of the same technical contents will be omitted.

Referring to both FIG. 2A and FIG. 2B, a main difference between a display device 10b in this embodiment and the display device 10a is that an anti-glare layer 210b is a cover plate, and the cover plate has a rough surface on a surface 210bs away from the display panel 100.

In detail, a material included in the anti-glare layer 210b may be the same or similar to the material included in the cover plate 212a in the above embodiment, for example. In some embodiments, the rough surface of the anti-glare layer 210b may be formed by performing an etching process on the anti-glare material layer (not shown). In the etching process, hydrofluoric acid may be used for etching, but the disclosure is not limited thereto. On this basis, the surface 210bs of the anti-glare layer 210b may, for example, have multiple concave surfaces 210CO, and the surface 210bs of the anti-glare layer 210b may also be used, for example, to increase the diffusion of the ambient light from the outside and/or reduce the direct reflection of the ambient light from the outside, so that the anti-glare layer 210b has the anti-glare properties to improve the comfort of the user viewing the display device 10b. In some embodiments, an arithmetic average deviation (Ra) of a profile of the surface 210bs of the anti-glare layer 210b is between 0.1 μm and 0.5 μm (0.1 μm≤Ra≤0.5 μm), and an average width (Rsm) of the profile of the surface 210bs of the anti-glare layer 210b is between 5 μm and 20 μm (5 μm≤Rsm≤20 μm). A measurement method of the arithmetic average deviation (Ra) and the average width (Rsm) of the profile of the surface 210bs of the anti-glare layer 210b may be, for example, the same as or similar to a measurement method of the arithmetic average deviation (Ra) and the average width (Rsm) of the profile of the surface 214as of the anti-glare film 214a. Therefore, the same details will not be repeated in the following.

Figure 3A:
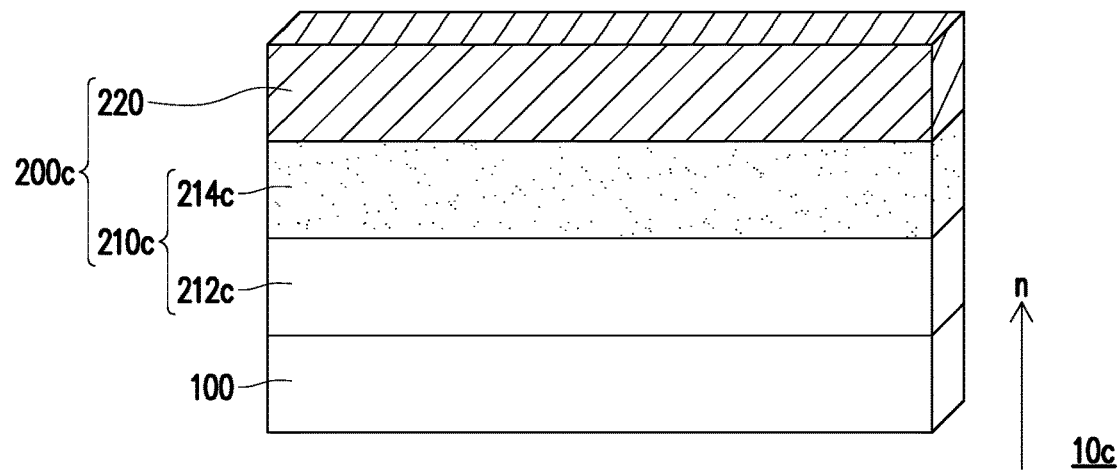
FIG. 3A is a schematic perspective view of a display device according to the third embodiment of the disclosure.
Figure 3B:
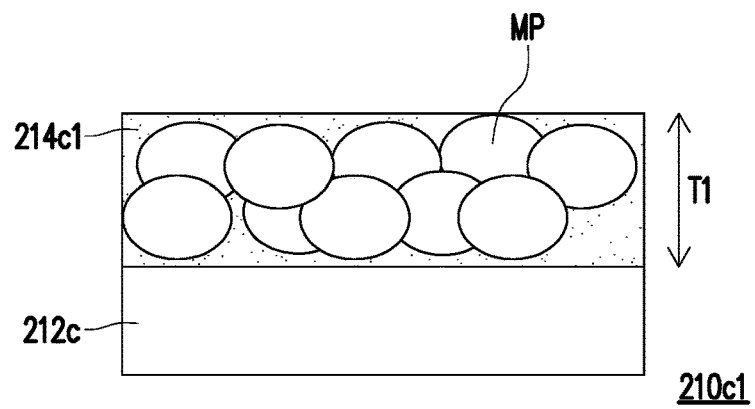
FIG. 3B is a schematic partial cross-sectional view of an anti-glare layer in an optical structure layer according to an embodiment of FIG. 3A.
Figure 3C:
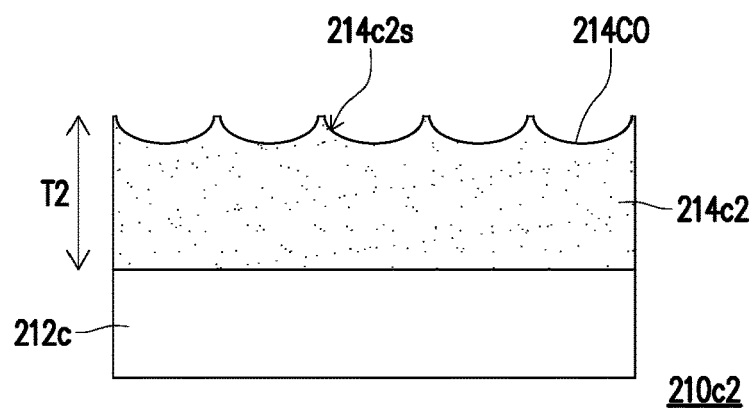
FIG. 3C is a schematic partial cross-sectional view of the anti-glare layer in the optical structure layer according to another embodiment of FIG. 3A.

FIG. 3A is a schematic perspective view of a display device according to the third embodiment of the disclosure. FIG. 3B is a schematic partial cross-sectional view of an anti-glare layer in an optical structure layer according to an embodiment of FIG. 3A. FIG. 3C is a schematic partial cross-sectional view of the anti-glare layer in the optical structure layer according to another embodiment of FIG. 3A. It should be noted that some of the reference numerals and descriptions of the embodiment of FIG. 1A will apply to FIG. 3A, and some of the reference numerals and descriptions of the embodiment of FIG. 1B will apply to FIG. 3B and FIG. 3C. The same or similar reference numerals will represent the same or similar components, and the descriptions of the same technical contents will be omitted.

Referring to FIG. 3A to FIG. 3C together, a main difference between a display device in this embodiment and the display device 10a is that an anti-glare layer 210c includes a substrate 212c and a hard coat layer 214c.

In detail, in this embodiment, the substrate 212c is disposed on the display panel 100 and located between the display panel 100 and the hard coat layer 214c in the normal direction n of the display panel 100. The substrate 212c has, for example, light transmission and/or adhesion with the hard coat layer 214c and the display panel 100. In some embodiments, a material of the substrate 212c may include organic materials, inorganic materials, or a combination thereof, and the disclosure is not limited thereto. In some embodiments, the hard coat layer 214c may have, for example, a configuration of a hard coat layer 214c1 and a hard coat layer 214c2 as shown in FIG. 3B and FIG. 3C respectively, but the disclosure is not limited thereto.

In some embodiments, as shown in FIG. 3B, the hard coat layer 214c1 in the anti-glare layer 210c1 is disposed on the substrate 212c, and the hard coat layer 214c1 includes the curable resin (such as the photocurable resin or the thermal curable resin) and the silicon dioxide particles MP. In some embodiments, the hard coat layer 214c1 may be formed by performing the coating process to coat a curable composition on the substrate 212c, and then perform the curing process on the curable composition. The above coating process may include the spray coating process, and the above curing process may include the light curing process or the thermal curing process. However, the disclosure is not limited thereto. The silicon dioxide particles MP included in the hard coat layer 214c1 may be used, for example, to increase the diffusion of the ambient light from the outside and/or reduce the direct reflection of the ambient light from the outside, so that the anti-glare layer 210c has the anti-glare properties. In some other embodiments, the silicon dioxide particles MP included in the hard coat layer 214c1 may form the irregular protrusions (not shown) on a surface of the hard coat layer 214c1 away from the substrate 212c, but the disclosure is not limited thereto. In some embodiments, a thickness T1 of the hard coat layer 214c1 is between 1 μm and 3 μm (1 μm≤T1≤3 μm), which may enable the hard coat layer 214c1 to have appropriate hardness and/or strength, but the disclosure is not limited thereto.

In other embodiments, as shown in FIG. 3C, the hard coat layer 214c2 in the anti-glare layer 210c2 is disposed on the substrate 212c, and the hard coat layer 214c2 has a rough surface on a surface 214c2s away from the substrate 212c. In some embodiments, the rough surface of the hard coat layer 214c2 may be formed by performing a nanoimprint process on a hard coat material layer (not shown), but the disclosure is not limited thereto. In other embodiments, the rough surface of the hard coat layer 214c2 may be formed by performing the etching process on the hard coat material layer (not shown). On this basis, the surface 214c2s of the hard coat layer 214c2 may, for example, have multiple concave surfaces 214CO, and the surface 214c2s of the hard coat layer 214c2 may also, for example, be used to increase the diffusion of the ambient light from the outside and/or reduce the direct reflection of the ambient light from the outside, so that the hard coat layer 214c2 has the anti-glare properties to improve the comfort of the user viewing the display device 10c. In some embodiments, an arithmetic average deviation (Ra) of a profile of the surface 214c2s of the hard coat layer 214c2 is between 0.1 μm and 0.5 μm (0.1 μm≤Ra≤0.5 μm), and an average width (Rsm) of the profile of the surface 214c2s of the hard coat layer 214c2 is between 5 μm and 20 μm (5 μm≤Rsm≤50 μm). A measurement method of the arithmetic average deviation (Ra) and the average width (Rsm) of the profile of the surface 214c2s of the hard coat layer 214c2 may be, for example, the same as or similar to the measurement method of the arithmetic average deviation (Ra) and the average width (Rsm) of the profile of the surface 214as of the anti-glare film 214a. Therefore, the same details will not be repeated in the following. In some embodiments, a thickness T2 of the hard coat layer 214c2 is between 1 μm and 3 μm (1 μm≤T2≤3

μm), which may enable the hard coat layer 214c2 to have appropriate hardness and/or strength, but the disclosure is not limited thereto.

Figure 4A:
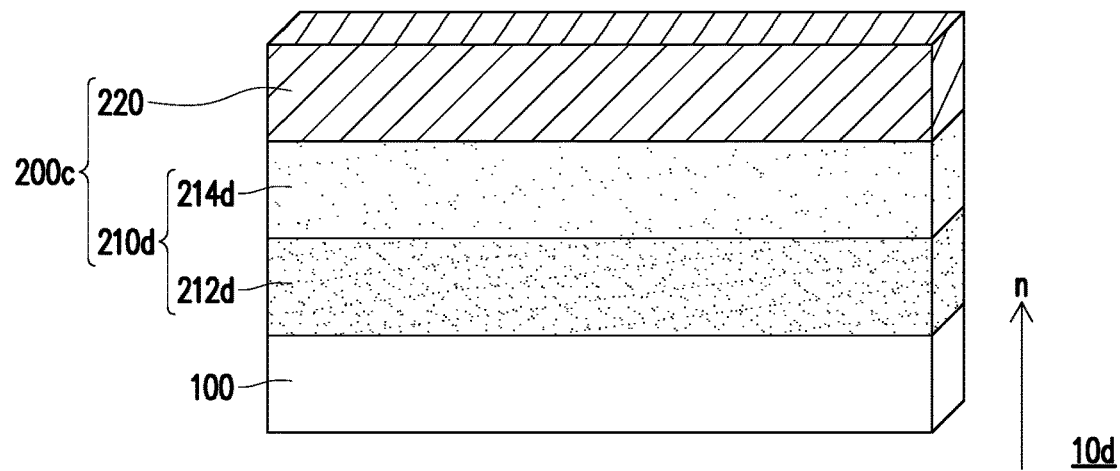
FIG. 4A is a schematic perspective view of a display device according to the fourth embodiment of the disclosure.
Figure 4B:
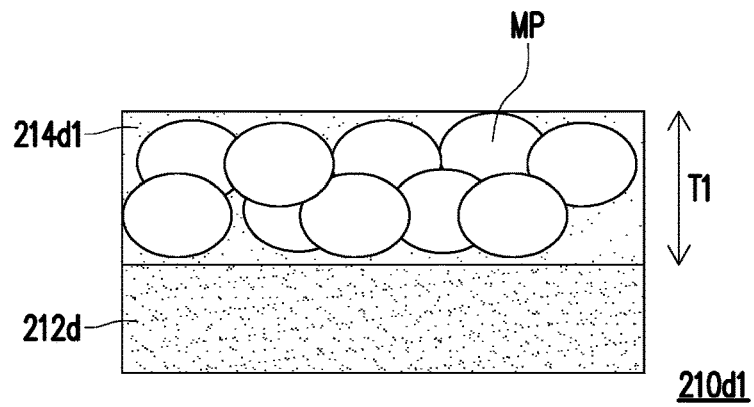
FIG. 4B is a schematic partial cross-sectional view of an anti-glare layer in an optical structure layer according to an embodiment of FIG. 4A.
Figure 4C:
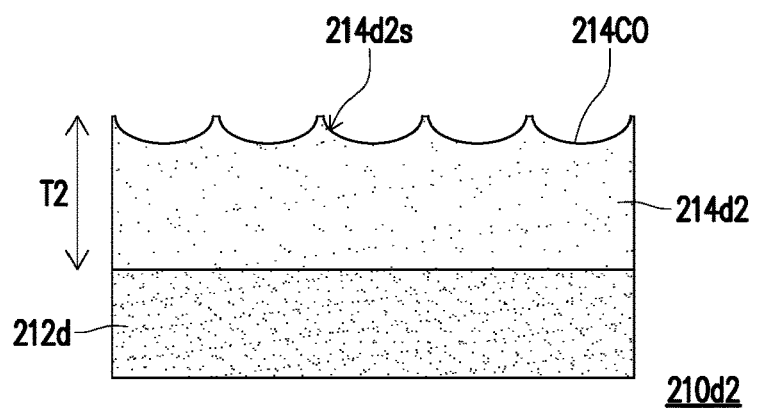
FIG. 4C is a schematic partial cross-sectional view of the anti-glare layer in the optical structure layer according to another embodiment of FIG. 4A.

FIG. 4A is a schematic perspective view of a display device according to the fourth embodiment of the disclosure. FIG. 4B is a schematic partial cross-sectional view of an anti-glare layer in an optical structure layer according to an embodiment of FIG. 4A. FIG. 4C is a schematic partial cross-sectional view of the anti-glare layer in the optical structure layer according to another embodiment of FIG. 4A. It should be noted that some of the reference numerals and descriptions of the embodiment of FIG. 3A will apply to FIG. 4A, and some of the reference numerals and descriptions of the embodiments of FIG. 3B and FIG. 3C will apply to FIG. 4B and FIG. 4C. The same or similar reference numerals will represent the same or similar components, and the descriptions of the same technical contents will be omitted.

Referring to FIG. 4A to FIG. 4C together, a main difference between a display device in this embodiment and the display device 10c is that an anti-glare layer 210d includes a polarizing plate 212d and a hard coat layer 214d.

In detail, in this embodiment, the polarizing plate 212d is disposed on the display panel 100 and located between the display panel 100 and the polarizing plate 212d in the normal direction n of the display panel 100. The polarizing plate 212d may, for example, include a structure in which a lower protective film (not shown), a polarizer (not shown), and an upper protective film (not shown) are stacked in this order in the normal direction n of the display panel 100, but the disclosure is not limited thereto. In some embodiments, the hard coat layer 214d may, for example, have a configuration of a hard coat layer 214d1 and a hard coat layer 214d2 as shown in FIG. 4B and FIG. 4C respectively, but the disclosure is not limited thereto.

In some embodiments, as shown in FIG. 4B, the hard coat layer 214d1 in an anti-glare layer 210d1 is disposed on the polarizing plate 212d, and the hard coat layer 214d1 includes a the silicon dioxide particles MP. A material, a forming method, and characteristics of the hard coat layer 214d1 may be the same as or similar to those of the hard coat layer 214c1. Therefore, the same details will not be repeated in the following.

In other embodiments, as shown in FIG. 4C, the hard coat layer 214d2 in an anti-glare layer 210d2 is disposed on the polarizing plate 212d, and the hard coat layer 214d2 has a rough surface on a surface 214d2s away from the polarizing plate 212d. It should be noted that a material, a forming method, and characteristics of the hard coat layer 214d2 may be the same as or similar to those of the hard coat layer 214c2. Therefore, the same details will not be repeated in the following.

Figure 5A:
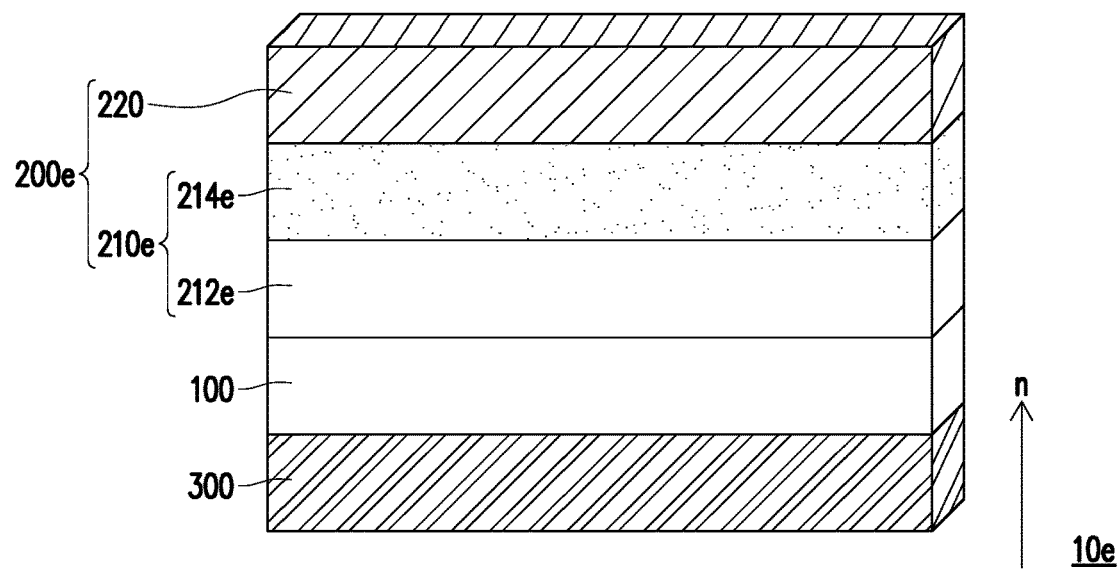
FIG. 5A is a schematic perspective view of a display device according to the fifth embodiment of the disclosure.
Figure 5B:
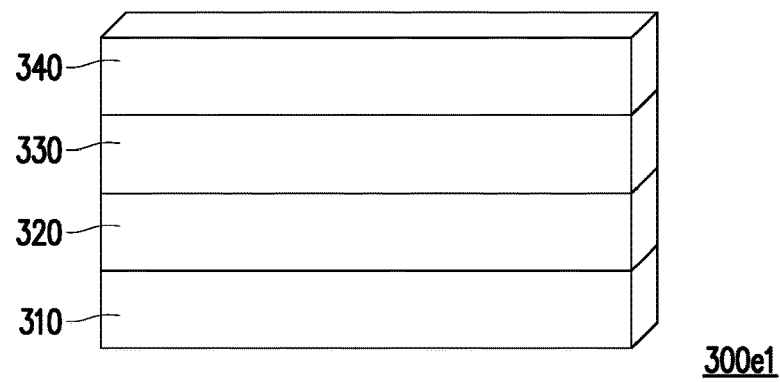
FIG. 5B is a schematic perspective view of a backlight module in an optical structure layer according to an embodiment of FIG. 5A.
Figure 5C:
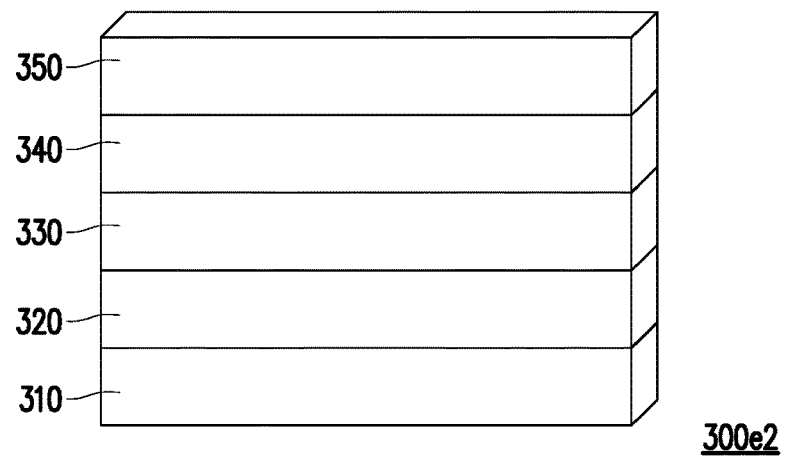
FIG. 5C is a schematic perspective view of the backlight module in the optical structure layer according to another embodiment of FIG. 5A.

FIG. 5A is a schematic perspective view of a display device according to the fifth embodiment of the disclosure. FIG. 5B is a schematic perspective view of a backlight module in an optical structure layer according to an embodiment of FIG. 5A. FIG. 5C is a schematic perspective view of the backlight module in the optical structure layer according to another embodiment of FIG. 5A. It should be noted that some of the reference numerals and descriptions of the embodiment of FIG. 4A will apply to FIG. 5A, and some of the reference numerals and descriptions of the embodiments of FIG. 4B and FIG. 4C will apply to FIG. 5B and FIG. 5C. The same or similar reference numerals will represent the same or similar components, and the descriptions of the same technical contents will be omitted.

Referring to FIG. 5A to FIG. 5C together, a main difference between a display device 10e in this embodiment and the display device 10d is that the display device 10e further includes a backlight module 300.

It is worth noting that a structure of an optical structure layer 200e included in the display device 10e may be the same or similar to those of the optical structure layer 200a, the optical structure layer 200b, the optical structure layer 200c, or the optical structure layer 200d in the above embodiments. For example, the optical structure layer 200e may include an anti-glare layer 210e and the antireflection layer 220. The anti-glare layer 210e is the same as or similar to the anti-glare layer 210a in the above embodiment. That is, the anti-glare layer 210e may also include a cover plate 212e and an anti-glare film 214e.

The backlight module 300 is, for example, configured to provide the light to the display panel 100. In some embodiments, the backlight module 300 may, for example, have a configuration of a backlight module 300e1 and a backlight module 300e2 as shown in FIG. 5B and FIG. 5C respectively, but the disclosure is not limited thereto.

In some embodiments, as shown in FIG. 5B, the backlight module 300e1 includes a reflection sheet 310, a light guide plate 320, a lower diffusion sheet 330, and an upper diffusion sheet 340. The reflection sheet 310, the light guide plate 320, the lower diffusion sheet 330, and the upper diffusion sheet 340 may be stacked in this order in the normal direction n of the display panel 100, but the disclosure is not limited thereto.

In other embodiments, as shown in FIG. 5C, the backlight module 300e2 includes the reflection sheet 310, the light guide plate 320, the lower diffusion sheet 330, the upper diffusion sheet 340, and a brightness enhancement film 350. The brightness enhancement film 350 includes a dual brightness enhancement film (DBEF), and the reflection sheet 310, the light guide plate 320, the lower diffusion sheet 330, the upper diffusion sheet 340, and the brightness enhancement film 350 are stacked in this order in the normal direction n of the display panel 100. In this embodiment, the brightness enhancement film 350 may be configured to enable the light from the light guide plate 320 to have uniform brightness at various viewing angles.

The reflection sheet 310 has a high reflectivity, for example, and may be configured, for example, to reflect the light passing through the light guide plate 320 back into the light guide plate 320 again, thereby increasing the use efficiency of the light in the display panel 100.

The light guide plate 320 has, for example, a high light transmittance, and may be configured, for example, to guide a direction in which the light travels. In detail, the light guide plate 320 may provide the light emitted from a direct type light source (not shown) or a side incident type light source (not shown) into the display panel 100.

The lower diffusion sheet 330 is configured to diffuse the light from the light guide plate 320 and has a high light transmittance, for example, and the upper diffusion sheet 340 is configured to further diffuse the light from the light guide plate 320, for example, and may be configured to conceal blemishes. In this embodiment, the upper diffusion sheet 340 is directly disposed on the lower diffusion sheet 330. In detail, no optical film layer is disposed between the upper diffusion sheet 340 and the lower diffusion sheet 330, but there may be an air gap or an adhesive layer between the upper diffusion sheet 340 and the lower diffusion sheet 330. On this basis, the display panel 100 may receive the uniform light from the lower diffusion sheet 330 and the upper diffusion sheet 340, so that the display device 10e may have a relatively wide viewing angle.

Figure 5D:
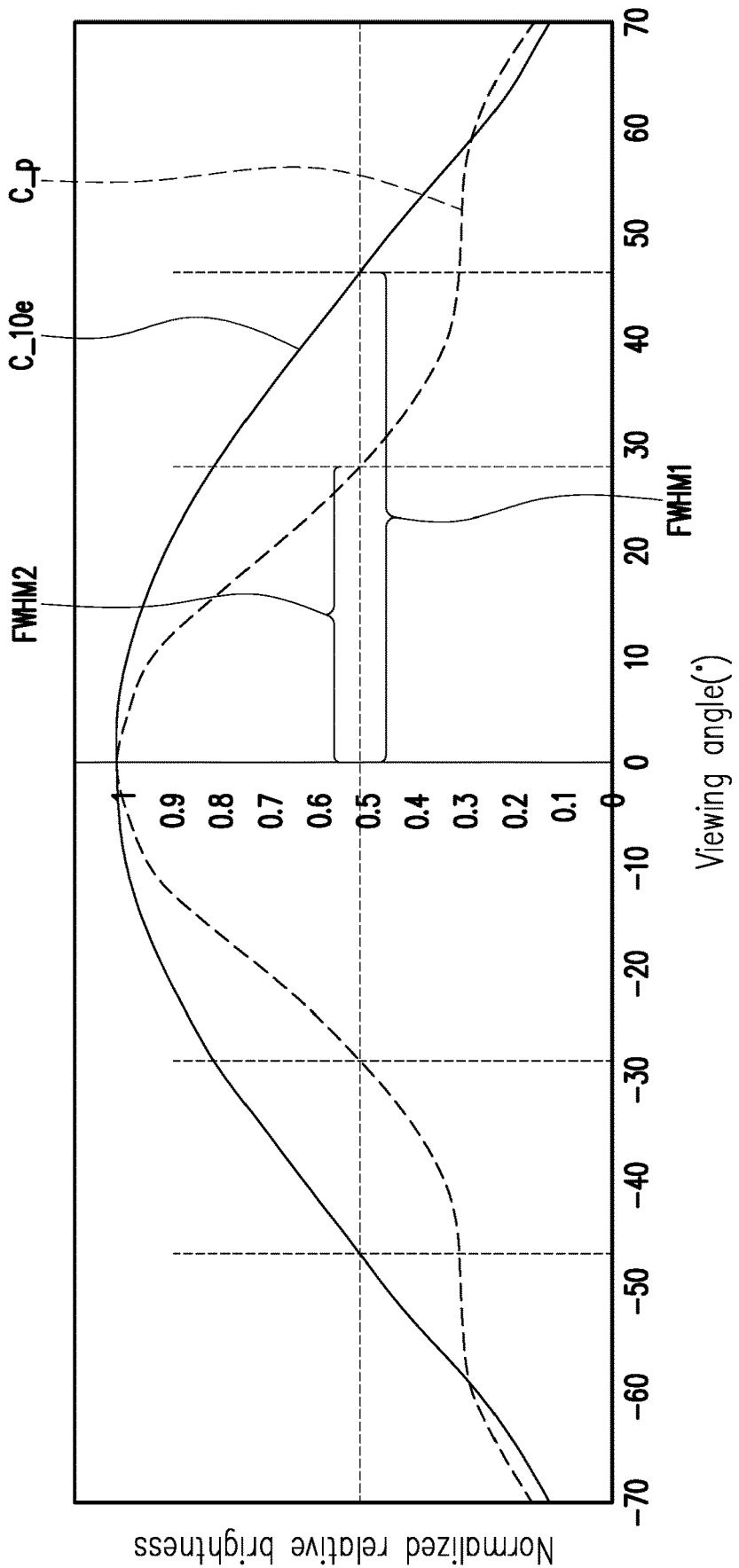
FIG. 5D is a relationship graph between brightness and a viewing angle of the display device in FIG. 5A and a conventional display device.

For example, as shown in FIG. 5D, FIG. 5D shows a relationship curve C_10e between a brightness and a viewing angle of the display device 10e in this embodiment and a relationship curve C_p between a brightness and a viewing angle of a conventional display device. Compositions of the backlight modules respectively included in the display device 10e and the conventional display device are shown in Table 3 below.

TABLE 3

|  | Display device 10e | Conventional display device |
|---|---|---|
| Lamination composition of the backlight module | Upper diffusion sheet 340 — Lower diffusion sheet 330 Light guide plate 320 Reflection sheet 310 | Upper diffusion sheet Cross BEF Lower diffusion sheet Light guide plate Reflection sheet |
| Difference between the viewing angle corresponding to half of the light intensity provided by the backlight module and the angle of the front viewing angle | 45° | 25° |

Referring to FIG. 5D and Table 3, the light distribution curve C_10e provided by the backlight module 300 in the display device 10e in this embodiment has a relatively wide full width at a half maximum FWHM1. that is, the light provided by the backlight module 300 has a relatively wide and gentle distribution, so that brightness distribution of the display device 10e in this embodiment is evenly distributed at each viewing angle, and it may still have a relatively high brightness at a wider viewing angle. In contrast, since the backlight module in the conventional display device includes a cross brightness enhancement film disposed between the upper diffusion sheet and the lower diffusion sheet, the light provided by the backlight module is concentrated at the front viewing angle, so that the light distribution curve C_p has a relatively narrow full width at a half maximum FWHM2. That is, the brightness of the conventional display device will rapidly decay with the increase of the viewing angle, so that the user's perception of viewing the conventional display device is not good.

Based on the above, by enabling the glossiness of the optical structure layer in the display device provided by the embodiments of the disclosure to be between 4 GU and 35 GU and the reflectivity of specular component included (SCI) of the optical structure layer to be between 3% to 6%, it may enable the display device in the embodiments of the disclosure to have the relatively low glossiness and the relatively low reflectivity of specular component included (SCI). In this way, the anti-glare performance of the display device in the embodiments of the disclosure may be improved, and the ambient light from the outside may be effectively scattered. On this basis, when the user views the display device included in the embodiments of the disclosure, the influence of reflection of the ambient light from the outside may be reduced, so that the user experiences the display device with the high display quality.

Lastly, it is to be noted that: the embodiments described above are only used to illustrate the technical solutions of the disclosure, and not to limit the disclosure; although the disclosure is described in detail with reference to the embodiments, those skilled in the art should understand: it is still possible to modify the technical solutions recorded in the embodiments, or to equivalently replace some or all of the technical features; the modifications or replacements do not cause the essence of the corresponding technical solutions to deviate from the scope of the technical solutions of the embodiments.

What is claimed is:

1. A display device, comprising:
a display panel; and
an optical structure layer disposed on the display panel, wherein a glossiness of the optical structure layer is between 4 GU and 35 GU, and a reflectivity of specular component included (SCI) of the optical structure layer is between 3% and 6%.

2. The display device according to claim 1, wherein the glossiness of the optical structure layer is further between 4 GU and 30 GU.

3. The display device according to claim 2, wherein the glossiness of the optical structure layer is further between 4 GU and 20 GU.

4. The display device according to claim 1, wherein a transmittance of the optical structure layer is between 70% and 98%.

5. The display device according to claim 4, wherein the transmittance of the optical structure layer is further between 70% and 95%.

6. The display device according to claim 1, wherein the reflectivity of specular component included of the optical structure layer is between 4% and 6%.

7. The display device according to claim 1, wherein a glossiness of the display device is less than 5 GU, and a reflectivity of specular component included of the display device is less than 3%.

8. The display device according to claim 1, wherein a ratio of a reflectivity of specular component excluded (SCE) to a reflectivity of specular component included of the display device is greater than 0.6 and less than 1.

9. The display device according to claim 1, wherein the display device is a liquid crystal display device, an organic light emitting diode display device, a micro light emitting diode display device, or a reflective display device.

10. The display device according to claim 1, wherein the optical structure layer comprises an anti-glare layer and an antireflection layer, wherein the antireflection layer is disposed on the anti-glare layer.

11. The display device according to claim 10, wherein the anti-glare layer is a cover plate, and the cover plate has a rough surface.

12. The display device according to claim 10, wherein the anti-glare layer comprises a cover plate and an anti-glare film, the anti-glare film is disposed on the cover plate, and the anti-glare film comprises a plurality of silicon dioxide particles.

13. The display device according to claim 10, wherein the anti-glare layer comprises a substrate and a hard coat layer, the hard coat layer is disposed on the substrate, and the hard coat layer has a rough surface.

14. The display device according to claim 10, wherein the anti-glare layer comprises a substrate and a hard coat layer, the hard coat layer is disposed on the substrate, and the hard coat layer comprises a plurality of silicon dioxide particles.

15. The display device according to claim 10, wherein the display panel comprises a polarizing plate, the anti-glare layer comprises a hard coat layer, the hard coat layer is disposed on the polarizing plate, and the hard coat layer has a rough surface.

16. The display device according to claim 10, wherein the display panel comprises a polarizing plate, the anti-glare layer comprises a hard coat layer, the hard coat layer is disposed on the polarizing plate, and the hard coat layer comprises a plurality of silicon dioxide particles.

17. The display device according to claim 10, wherein the antireflection layer comprises a plurality of high reflectivity sub-layers and a plurality of low reflectivity sublayers that are alternately stacked.

18. The display device according to claim 17, wherein a total number of the high reflectivity sub-layers and the low reflectivity sub-layers is greater than or equal to four.

19. The display device according to claim 1, further comprising a backlight module, wherein the backlight module is configured to provide light to the display panel, and a difference between an angle of a viewing angle corresponding to half of intensity of the light and an angle of a front viewing angle is greater than 40 degrees.

20. The display device according to claim 19, wherein the backlight module comprises an upper diffusion film and a lower diffusion film, and the upper diffusion film is directly disposed on the lower diffusion film.

21. A display device, comprising:
a display panel; and
an optical structure layer disposed on the display panel, wherein the optical structure layer comprises an anti-glare layer and an antireflection layer, wherein the antireflection layer is disposed on the anti-glare layer,
wherein a glossiness of the display device is less than 5 GU, and a reflectivity of specular component included of the display device is less than 3%.

22. A display device, comprising:
a display panel; and
an optical structure layer disposed on the display panel, wherein the optical structure layer comprises an anti-glare layer and an antireflection layer, wherein the antireflection layer is disposed on the anti-glare layer,
wherein a ratio of a reflectivity of specular component excluded (SCE) to a reflectivity of specular component included of the display device is greater than 0.6 and less than 1.

* * * * *